United States Patent
Dunne et al.

(10) Patent No.: US 7,894,795 B1
(45) Date of Patent: Feb. 22, 2011

(54) NETWORK ACTIVATION OF A TELEMATICS UNIT FOR WIRELESS COMMUNICATION

(75) Inventors: Kevin Francis Dunne, North Brunswick, NJ (US); Bruce Joel Rappoport, Bridgewater, NJ (US); James McHenry, Point Pleasant, PA (US)

(73) Assignee: Cello Partnership, Basking Ridge, NJ (US)

( * ) Notice: Subject to any disclaimer, the term of this patent is extended or adjusted under 35 U.S.C. 154(b) by 910 days.

(21) Appl. No.: 11/819,188

(22) Filed: Jun. 26, 2007

(51) Int. Cl.
*H04M 11/00* (2006.01)
(52) U.S. Cl. .................. 455/406; 455/418; 455/419
(58) Field of Classification Search .............. 455/406, 455/418, 419
See application file for complete search history.

(56) References Cited

U.S. PATENT DOCUMENTS

| | | | |
|---|---|---|---|
| 6,076,028 | A | 6/2000 | Donnelly et al. |
| 6,549,770 | B1 | 4/2003 | Marran |
| 6,587,684 | B1 | 7/2003 | Hsu et al. |
| 6,778,821 | B1 | 8/2004 | Shunk |
| 7,200,390 | B1 | 4/2007 | Henager et al. |
| 2005/0208936 | A1* | 9/2005 | Sumcad et al. ............. 455/423 |
| 2006/0094473 | A1* | 5/2006 | Stark et al. ............... 455/569.2 |
| 2007/0254639 | A1* | 11/2007 | Chmielewski et al. ...... 455/419 |

OTHER PUBLICATIONS

"OnStar Technology", Mar. 26, 2007, URL: http//www.Onstar.com/us_english/jsp/explore/onstar_basics/technology.jsp#equipment, OnStar Corp.

* cited by examiner

*Primary Examiner*—Barry W Taylor
(74) *Attorney, Agent, or Firm*—McDermott Will & Emery LLP (57) ABSTRACT

Technology is disclosed for activating a telematics unit, particularly with respect to wireless communication service through a mobile network, e.g. to re-activate a unit that was previously de-activated. In a detailed example, a user initiates a unique action such as a two-button push or holding down certain buttons on the telematics unit, which causes the unit to initiate a call to the telematics service provider (TSP), e.g. by dialing a cleared number. The serving wireless switch routes the cleared number call to the TSP, who will gather user information and activate the unit for telematics service. The TSP then forwards an activation request identifying the unit, to the network operator. The operator updates its systems in a manner to enable downloading of provisioning data, typically including a mobile directory number/mobile identification number (MDN/MIN), to the telematics unit through the mobile wireless network.

6 Claims, 5 Drawing Sheets

NETWORK ACTIVATION OF A TELEMATICS UNIT FOR WIRELESS COMMUNICATION

TECHNICAL FIELD

The present subject matter relates to techniques and equipment to activate a telematics unit with respect to wireless communication service through a mobile network, particularly a unit that has previously been de-activated.

BACKGROUND

In recent years, increasingly sophisticated telematics systems have been developed to detect an emergency condition or activation, and in response, initiate a call to a call center. Systems have been developed for monitoring fixed customer premises locations or personnel at specific site as well as for vehicle applications. For motor vehicle applications, for example, an on-board system monitors one or more sensors to determine when a crash or other emergency has occurred. Upon detecting an emergency condition, such as a crash, the on-board system activates a cellular transceiver to initiate a cellular telephone call to a call center of the telematics service provider (TSP). Upon connection to the call center, the system may communicate certain data, such as location determined by global positioning satellite (GPS) processing, identification data and crash related data. After the data transmission, the call is converted to a voice call in which a TSP representative at the call center can attempt voice communication with an occupant of the vehicle. The TSP also offers mechanisms for the representative to contact emergency service personnel in the area, to respond appropriately to the incident.

For mobile applications in vehicles, the primary communication resource is a cellular transceiver for communications via a public mobile wireless communication network, typically operated by a mobile service provider or carrier. Even some fixed location installations may utilize communications through a mobile service provider's network because the service is less likely to be interrupted by events that might otherwise damage landline network facilities at the location.

Typically, the telematics customer subscribes to the telematics service from a telematics service provider TSP. The TSP in turn contracts with a wireless service provider, so that the customer's telematics unit at the location or in the vehicle is active for wireless communication via the mobile network. With respect to the communication service through the network, the TSP is essentially a reseller of the carrier's communication service. The customer's service will be active with respect to the TSP and its systems. However, the customer's telematics unit also must also be active with respect to the carrier's wireless communication network and associated equipment in essentially the same way as a mobile station of a regular subscriber to the carrier's services.

From time to time some telematics units will become dormant with respect to the service offered by the TSP, e.g. because the customer opts to terminate subscription and/or does not pay the bills for the telematics service. However, at a later time, the customer may opt to resume service. In the case of an automobile, a first owner may terminate the telematics service, but after a sale, a second owner may want to subscribe to the service and thus need to reactivate the telematics unit in the automobile. Also, new telematics units may be initially inactive, at least with respect to the network.

Previously, to activate an inactive telematics device, the vehicle manufacturer had to take an active role in the process utilizing a proprietary over-the-air activation application. Often times, reactivation would require the user to provide vehicle information such as the vehicle identification number (VIN) so that it could be correlated with the telematics control unit (TCU); and then, the TCU could be re-activated on the billing and network systems through the automobile manufacturer. Another method of activating or reactivating the device would be to bring the vehicle to a service center and gain physical access to the TCU via a handheld device, which would force the device to activate on the network. Using this method the TCU would have a VIN associated with it.

A need exists for a better technique for activating a telematics unit particularly one that is convenient for the user and/or does not require involvement of the manufacturer.

SUMMARY

The teachings herein alleviate one or more problems with re-activating a previously de-activated telematics unit for communications via a public mobile network. A result of the methods/equipment disclosed herein is to provide automated activation of a telematics unit, particularly, with respect to wireless communication service through a mobile network, e.g. to eliminate the need for assistance by a service technician and/or input of the VIN or the like.

Hence, a method is disclosed for activating a telematics unit for telematics communication via a mobile communication network. Such a method involves detecting a unique user actuation of the telematics unit indicating a user's intent to activate telematics service through the telematics unit; and in response, initiating a wireless call from the telematics unit, through the mobile communication network. This call is completed from the telematics unit through the mobile communication network to the telematics service provider. Information is communicated between the telematics unit and the telematics service provider, via the completed call through the mobile communication network, so as to activate telematics service with respect to the telematics unit. Upon activation of the telematics service, a message identifying the telematics unit is sent to a billing system of the mobile communication network requesting activation of service for the telematics unit through the mobile communication network. The method also entails communicating provisioning data, needed to activate the telematics unit for operation through the mobile communication network, from a system of the mobile communication network to the telematics unit.

In the disclosed examples, the mobile network is a public cellular telephone network, e.g. as normally provides mobile voice telephone services to subscribers using mobile stations. In such an example, the provisioning data includes a mobile directory number (MDN) and a mobile identification number (MIN) assigned to the telematics unit for use in wireless communications through the mobile communication network. The call to the telematics service provider may use a "cleared number," which in the cellular network example, is a number that the network will recognize and allow completion of the call without requiring authentication/validation of the calling station. In this way, the cleared number will allow devices, such as the inactive telematics units, that are not provisioned in the network, to complete a call through the network to a limited specific destination, in this case to the telematics service provider for service activation.

The detailed description discloses two examples of techniques to communicate the provisioning data to the telematics unit. In one exemplary technique, the system of the mobile communication network is the billing system, and the billing system communicates the provisioning data needed to activate the telematics unit for operation through the mobile communication network to the telematics service provider. The telematics service provider then downloads the provisioning data to the telematics unit, via the completed call through the mobile communication network.

An alternate approach to downloading the provisioning data allows use of the network operator's own provisioning system, such as may already be in place to provide over-the-air provisioning for the operator's mobile subscribers. With this approach, the telematics unit terminates its previously completed call with the telematics service provider, once activated for telematics service. Following termination, the unit initiates another wireless call through the mobile communication network, using a number assigned for mobile station service activation. Based on the mobile station service activation number, the network completes that call from the telematics unit to a service provisioning platform of the operator of the mobile communication network. When the call is completed to the platform, the platform downloads the provisioning data needed to activate the telematics unit for operation through the mobile communication network into the telematics unit.

Another disclosed method, as may be implemented from the perspective of the telematics unit, involves receiving activation information in the telematics unit from a telematics service provider, indicating activation of telematics service with respect to the telematics unit. In response to the indication of activation of the telematics service, a wireless call is automatically initiated from the telematics unit. The call extends through the mobile communication network, to a service provisioning platform of an operator of the mobile communication network. The method then entails receiving provisioning data, which is needed to activate the telematics unit for operation through the mobile communication network, from the service provisioning platform.

A disclosed telematics unit includes an interface for receiving signals from one or more input elements for monitoring with respect to possible occurrence of an emergency condition and a wireless transceiver for wireless communications through a mobile communication network. The unit also includes at least one processor coupled to the interface and the wireless transceiver, and a memory. The memory includes provisioning data storage as well as program storage containing programming for execution by the processor(s). Execution of the programming by the processor(s) enables the at least one processor to control operations of the telematics units to perform a number of functions. The functions include obtaining activation information in the telematics unit from a telematics service provider, indicating activation of telematics service with respect to the telematics unit. In response to activation of telematics service, the unit automatically initiates a wireless call from the telematics unit, through the mobile communication network, to a service provisioning platform of an operator of the mobile communication network. Then, the unit receives and stores provisioning data needed to activate the telematics unit for operation through the mobile communication network from the service provisioning platform. The unit is capable of processing signals received via the interface to detect occurrence of the emergency condition. Once provisioned, in response to detecting the occurrence of the emergency condition, the unit operates the wireless transceiver to initiate a communication attempt through the mobile communication network using the stored provisioning data.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

To activate or re-activate a dormant telematics unit in vehicle or the like, a user will initiate a unique action, such as a two-button push or holding down buttons on the user interface of the device located in the car. The unique action causes the unit to initiate a call by dialing a number previously assigned a cleared number status in the serving wireless switch(es). The serving wireless switch will route the call to the telematics service provider (TSP), who will gather all of the user information and notify/activate the billing system of the service provider that the device is now active. During the call, the electronic serial number (ESN) associated with the wireless transceiver in the telematics unit will also be transmitted, so as to identify the device being activated or re-activated. The TSP forwards an activation request, e.g. including the ESN, to the network service provider; and the provider will update its over-the-air (OTA) activation systems. In response, the OTA activation system will automatically download a mobile directory number/mobile identification number (MDN/MIN) to the telematics device to activate the device on the mobile wireless network. With this approach, for example, it is not necessary to give any consideration to the vehicle or the vehicle identification number (VIN) during this activation method. This method can be strictly based on the data from the TCU.

Figure 1:
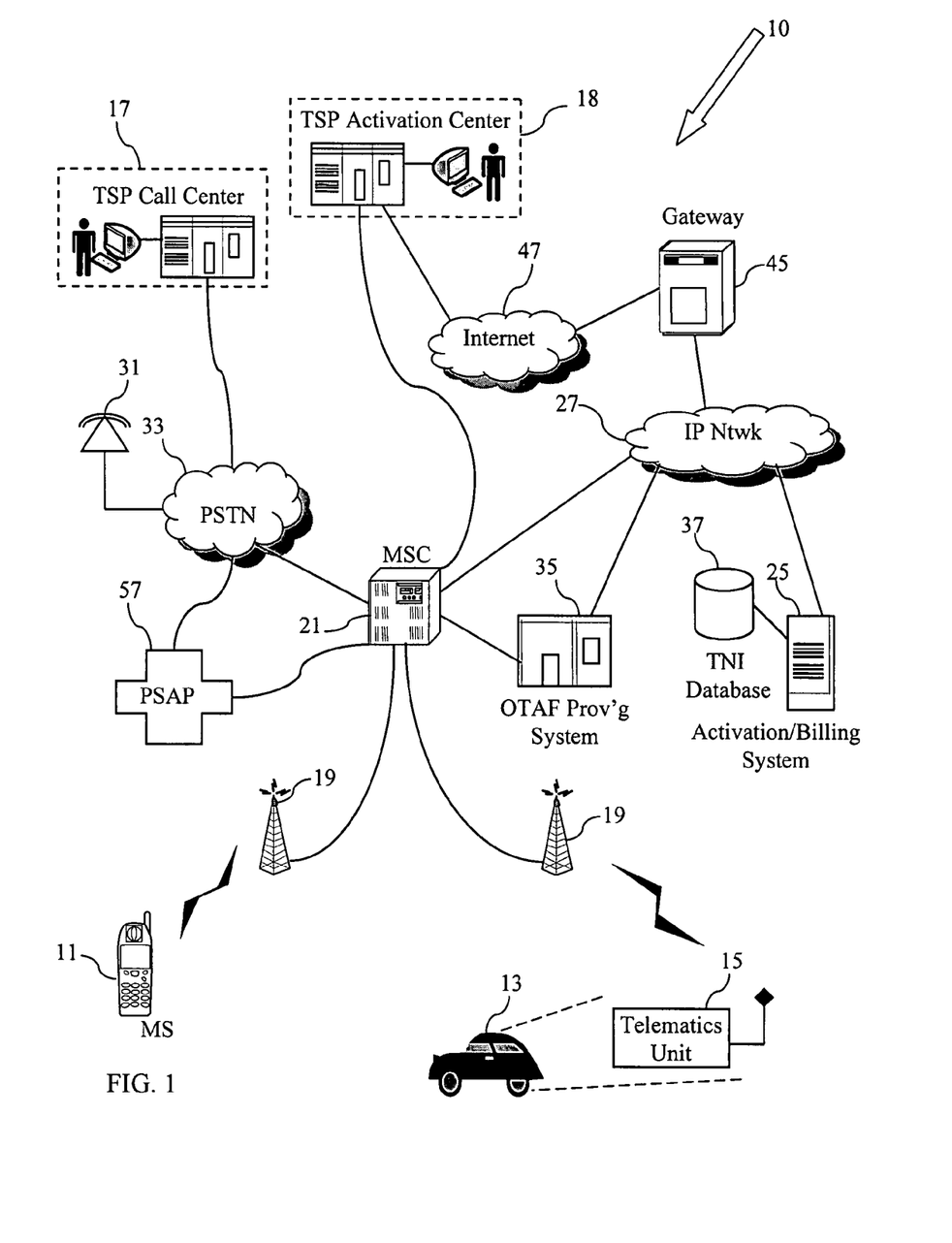
FIG. 1 is a high-level functional block diagram, showing a telematics unit, one or more TSP centers for emergency calls and activation calls, and a mobile wireless network providing communications between the telematics unit and the TSP center(s).

Reference now is made in detail to the examples illustrated in the accompanying drawings and discussed below. FIG. 1 is a functional block diagram of system 10 of networks and other equipment for providing wireless communication services for mobile stations 11, and those communications also support telematics communications for reporting emergencies and/or for service activation or de-activation functions. Although applicable to fixed location telematics communications, the example provides such communication for vehicle applications such as automatic crash notification. Hence, the drawing shows a vehicle 13 having an associated telematics unit 15 configured for crash detection and related emergency communication functions. The emergency communications extend through a wireless network offering mobile communication service, to data and voice communication equipment at a TSP call center 17. In a typical operation, the telematics unit 15 will detect a vehicle condition indicating a crash or other emergency condition of the vehicle 13 or will detect actuation of an "emergency" or "panic" button associated with the telematics unit 15 by an occupant of the vehicle. In response, the telematics unit 15 initiates communication through the mobile communication elements of the system 10 with the TSP call center 17.

To make a telematics call to the center 17 through the mobile communication network, a telematics unit 15 must appear to the network as a mobile station (similar to station 11) of a valid subscriber. Hence, the telematics unit must be activated for service, not only with respect to the TSP 17, but also with respect to the mobile wireless communication network. When the network activates a mobile station 11, or in this case a telematics unit 15, the network assigns MDN and MIN numbers to the particular wireless device. Typically, service activation entails loading at least the MIN into the mobile station 11. The network uses the MIN to authenticate the device 11 or 15 for service. The MIN is used for signaling between the network and the device but is not the dialed number of the mobile station or telematics unit. The network uses the MDN to route calls to the device and to identify the device to other parties, such as the TSP call center or a PSAP; and a network authentication element matches a MDN to the MIN, as or when needed in call processing. In some implementations, the MDN is programmed into the wireless device, and in such networks, the telematics unit 15 would be programmed with both its MIN and MDN. The disclosed activation techniques enable automatic provisioning of the unit 15 for wireless network service, including automatically programming the assigned number data (MIN and/or MDN) into memory within the telematics unit 15. Before discussing activation or re-activation procedures for inactive units 15, it may be helpful to first discuss the elements of the exemplary system 10 in somewhat more detail.

In many areas today, one or more wireless service providers or carriers operate base stations and switches to provide mobile communications services over a radio airlink for mobile stations 11. The example shows a limited number of such elements of one carrier's mobile network. Hence, in the example, the carrier operates a number of base stations 19 and a mobile switching center (MSC) 21, to provide mobile wireless communication services to mobile stations 11 operating within areas or regions served by the radio coverage of the base stations 19. Each base station 19 typically includes a base transceiver system which communicates via antennae of the base station and over the airlink with the mobile stations 11, when within range. To the base stations 19, the wireless transceiver of the telematics unit 15 appears as another mobile station.

Today, most versions of the MSC 21 provide circuit switched communications to/from mobile stations 11 and other networks or elements, although newer switching systems are being deployed that utilize packet switching technologies. Each wireless service provider's network typically includes a base station controller functionality that controls the functions of a number of base stations and helps to manage how calls made by each mobile station are transferred (or "handed-off") from one serving base station to another. Each wireless network equipment vender implements this function differently. Some vendors have a physical entity, which they call a base station controller, while other vendors include this functionality as part of their switch that forms the MSC 21. Each service provider's facilities may offer somewhat different services, e.g. voice call, text messaging, data or various combinations of these and other services. Also, the service providers will have different agreements in place as to how to treat each others' subscribers when roaming through the various networks.

In the example, the wireless service provider's network offers voice telephone service between mobile stations 11 as well as between a mobile station 11 and a telephone such as 31 through the public switched telephone network (PSTN) 33. The network offers the similar voice service to units of the TSP, and through the TSP to customers having active telematics units 15. However, the principle telematics usage is for calls from the telematics units 15 to the call center 17 of the TSP, to report emergencies.

Typically, the mobile station 11 or the telematics unit 15 is programmed with both the assigned MDN and the MIN numbers. However, in operation, it is the MIN that the base stations 19 broadcast over the signaling channel, e.g. to page the appropriate mobile station 11 when there is an incoming call (based on a caller dialing the MDN). The MIN is also used in registration signaling and in signaling of calls from a mobile station 11, and the telematics unit 15 uses its MIN during registration signaling as well as signaling for outgoing calls (e.g. emergency calls to the TSP call center 17).

For service activation, the TSP will also have an assigned cleared number. A cleared number is a number programmed into the switch(es) 21 of the network to cause the network to complete a call to that number regardless of whether the calling device is a validly provisioned device for receiving active service through the network. When a device dials a cleared number, the network does not do any authentication of the device, e.g. based on MIN or MDN. However, if the device is inactive, the network will not permit other calls to or from the device, whether the device is a mobile station or a telematics unit. The cleared number is used here to allow the telematics unit 15 to make a service activation call to the TSP.

To activate service, the TSP will typically operate a call-in center with equipment and personnel to collect customer information and activate telematics reporting service with respect to the monitored vehicle 13 or customer premises. The equipment and personnel for this function may be part of the emergency TSP call center 17. For ease of discussion here, we will assume that the TSP operates a separate call center 18 for its own service activation function. Hence, in our example, the cleared number is a number assigned to the TSP's activation center 18. Dialing of that cleared number by a telematics unit 15 will cause one or more of the MSCs 21 to complete the call to the TSP's activation center 18, without authenticating the device (e.g. without validation processing based on an assigned MIN or MDN).

As part of its management of customer account information, the wireless service provider also operates one or more computers implementing activation and billing functions. For discussion purposes, the drawing shows such an activation/billing system 25. The billing system maintains a record for each subscriber device that is activate for service through the provider's wireless mobile communication network, in this case including both mobile stations 11 and telematics units 15. The record of a telematics unit 15 in the system 25 will indicate that the unit is a telematics unit, e.g. by association with the TSP. The record for each device also includes various subscriber information and related billing information, as well as device identification information (such as an electronic serial number—ESN) and information as to one or more numbers that the network assigns to a mobile station 11 or to a telematics unit 15 upon service activation.

Service activation on the network may involve establishing or re-opening a record for a subscriber and the subscriber's device and populating that record with information needed to provision the network and the device for the appropriate network-provided communication service. The data in the record with include certain numbers assigned to the respective mobile station 11 or telematics unit 15.

As outlined above, each mobile station 11 or telematics unit 15 has an MDN assigned to it. Although the MDN may be used as a MIN, typically, each mobile station or telematics unit is assigned a separate MIN number for various signaling, registration and validation purposes. For example, the network routes incoming calls in response to a dialed MDN, but the network pages the appropriate mobile station 11 for the call using the station's MIN. To manage and assign these numbers, the activation/billing system 25 utilizes a Telephone Number Inventory (TNI) database 37. The database 37 may reside on the same computer platform that implements the activation/billing system 25 or on a separate computer platform in communication with the activation/billing system 25. In a typical scenario, the activation/billing system 25 will access that database to obtain an MDN to assign to a newly activated mobile station 11 or newly activated telematics unit 15. The TNI database 37 may also be used to manage MIN numbers, or a similar database may be provided for the MIN numbers.

The carrier typically operates or has access to a secure packet switched data communication network, shown as an Internet Protocol (IP) network 27 in the drawing, for a variety of data communication purposes in support of operations of the wireless mobile communication network. Of note for purposes of this discussion, the activation/billing system 25 connects to the IP network 27 for communications of data needed to activate service for a mobile station 11 or a telematics unit 15 to various elements of the wireless communication network, for example, to the assigned home MSC 21 and/or to a home location register (not separately shown).

To activate or reactivate service for a telematics unit, the equipment at the TSP activation center will communicate with the carrier's activation/billing system 25. In the example, the carrier will have a gateway 45 for security purposes. The gateway may implement a firewall, a proxy server and/or a variety of other access and security related functions to protect the IP network 27 and the other systems/network elements of the carrier. The TSP call center 18 connects to another IP network, such as the public Internet 47, to communicate data to and/or from the gateway 45; and the gateway 45 and IP network 27, enable TSP communications to go to/from the activation/billing system 25 in a secure fashion. For purposes of this discussion, such communications enable the TSP to request activation of mobile wireless communication service through the wireless network, for a telematics unit 15.

The network operator or carrier also operates a platform 35 implementing an automated Over-the-Air Service Activation/Provisioning Function (OTAF). The OTAF platform, for example, has a link for voice calls to one or more of the MSC switches 21 and for signaling communications through the mobile communication network. In a typical service activation or provisioning call, a user of the mobile station 11 dials a number assigned for calls to the OTAF platform 35, e.g. *228, and the MSC completes the call to the platform 35, which responds with an announcement or prompt. The platform may ask the user to key in one or more additional digits to select an appropriate option, e.g. 90 for new service activation of the mobile station or 91 for provisioning data update. Upon completion of the call to the platform, and entry of additional digits if appropriate, the platform downloads the appropriate provisioning data into the mobile station 11. The communication of the provisioning data typically uses signaling resources of the network, rather than the voice link, although the download could use the voice channel. As discussed more below, a similar procedure may be used to activate or reactivate mobile service for a telematics unit 15.

As part of its operations, the OTAF platform 35 receives data from the billing and activation system 25, for example, via the carrier's private IP network 27. For activation of mobile service, for example, the billing system 25 will advise the OTAF platform 35 of the MIN and the MDN assigned to the mobile station 11 or the telematics unit 15 for the mobile communication service through the wireless network.

In the illustrated example, platforms such as the activation/billing system and/or the OTAF provisioning system 35 may be implemented using a general class of data processing device commonly used to run "server" programming. Such a device typically utilizes general purpose computer hardware and is programmed to perform its respective server processing functions and to control the attendant communications via the network(s). Each such server, for example, includes a data communication interface for packet data communication via the network 27. The platform implementing the OTAF Provisioning system 35 may also include voice and signaling interfaces to the MSC 21 or other mobile network elements, for facilitating the communications with mobile stations 11 and telematics units 15. A server also includes a central processing unit (CPU), in the form of one or more processors, for executing program instructions. The server platform typically includes program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith.

For 911 emergency calls from mobile stations 11, and possibly for the telematics unit 15, the system 10 also includes a public safety answering point (PSAP) 57. Typically, the PSAP 57 is a call center for receiving voice calls from landline and wireless telephone stations. The PSAP typically includes data systems for determining the location of the 911 caller. For mobile network applications, each MSC switch is configured to route a 911 call from a mobile station 11 served by that switch to a PSAP 57 for the surrounding jurisdiction(s). 911 is an example of a "cleared" number, in that the network does not authenticate the calling device, i.e. so that any device even if inactive on the network can make a 911 call.

In normal operation, the telematics unit 15 dials a number for the TSP call center 17 upon detecting an emergency. The TSP number is programmed into memory of the telematics unit. The memory may store several such destination numbers, for sequential dialing if one or more call attempts should fail.

However, a cleared number also is programmed into the memory of the telematics unit 15, for use in making a service activation call, e.g. from a de-activated unit. Hence, upon detection of an event indicating a user's intent to subscribe to the TSP service, the telematics unit would automatically dial the cleared number for the TSP activation center 18. The mobile network would route such a call to the activation center 18, in a manner similar to routing a 911 call to the PSAP 57, without authenticating the calling device. Personnel at the center 18 will gather all of the user information. During the call, the electronic service number (ESN) associated with the wireless transceiver in the unit 15 will also be transmitted, so as to identify the device being activated. The TSP activation center 18 forwards an activation request, e.g. including the ESN, to the system 25 through the Internet 47, the security gateway 45 and the IP network 27. The system 25 will activate service for the device in the normal manner. For example, it will obtain an available MDN from the TNI database 37, and it will assign a MIN to the newly activated telematics unit 15. Two different approaches are discussed below (with regard to FIGS. 5 and 6) for automatically downloading the MDN/MIN data into the telematics unit 15 as part of the activation of the device on the mobile wireless network.

A number of the activities involved in the service activation are implemented by communication with the telematics unit 15 and/or involve responsive processing in that unit. It is assumed that those skilled in the art are generally familiar with the structure, programming and operations of mobile stations and telematics units that utilize mobile communication transceivers similar to those of mobile stations. However, to fully understand the relevant communication and processing under discussion here, it may be helpful to some readers to consider a summary discussion of the structure and programming of an example of a telematics unit, before discussion of the detailed examples of process flows for service activation.

Figure 2:
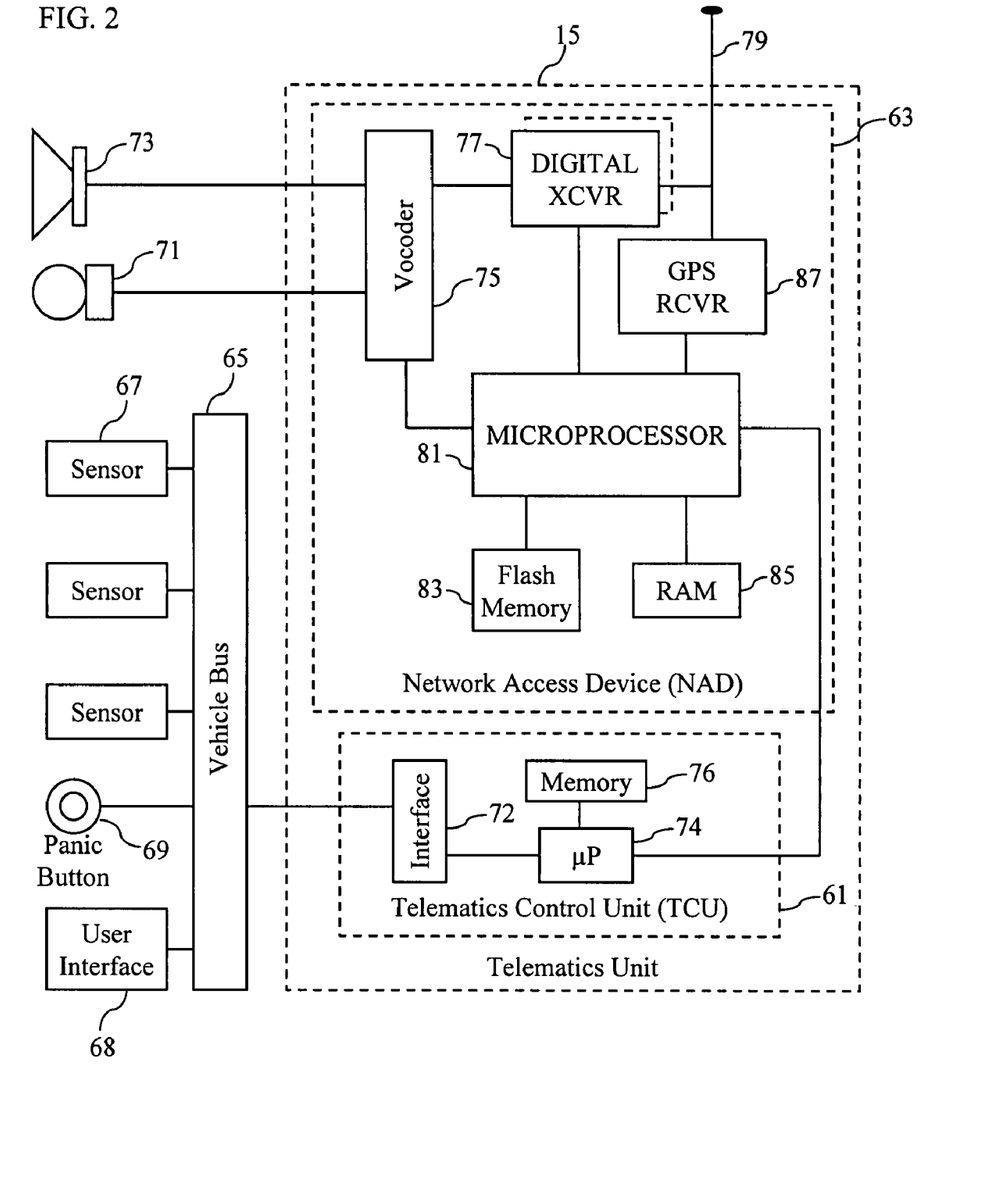
FIG. 2 is a high-level functional block diagram of a telematics unit and associated equipment, as may be provided in a vehicle of a customer of the telematics service provider.

FIG. 2 is a functional block diagram of an exemplary telematics unit 15 and associated equipment, as may be used in a vehicle 13 shown in FIG. 1. The telematics unit 15 includes a telematics control unit (TCU) 61 and a wireless Network Access Device (NAD) 63. The TCU 61 may be implemented as a microprocessor (µP) 74 with one or more memories 76, an interface 72 to vehicle equipment, an interconnection to the NAD, and programming to implement the emergency monitoring and notification functions. Programming in the memory 76 of the TCU 61, for example, enables the TCU microprocessor 74 to process the signals received via the interface 72 to detect occurrence of the emergency condition, and in response to detecting the occurrence of the emergency condition to instruct the NAD 63 to initiate an emergency call. The programming in the memory 76 of the TCU 61 also enables the TCU microprocessor 74 to process the signals received via the interface 72 to detect a unique user activation, which indicates the user's desire to activate telematics service, and in response, to instruct the NAD 63 to initiate an activation call using the cleared number to the TSP service activation center 18.

A vehicle 13 (FIG. 1) typically includes a vehicle bus, shown at 65 in FIG. 2, for providing digital data communications among various on-board devices/systems, particularly for vehicle diagnostics purposes. For crash detection, the vehicle includes one or more sensors 67 for detecting conditions that may relate to a crash, and the vehicle bus 65 provides the continuous electrical connection within the vehicle for the communication of diagnostics data from the sensors 67 to the TCU 61. The TCU 61 is programmed to process data received from the sensors 67 to determine if there has been a crash and to generate data regarding the detected crash, e.g. to indicate severity. The vehicle may also include a panic button 69, coupled to communicate with the TCU 61 via the vehicle bus 65. A vehicle occupant would activate the panic button 69 in the event of a condition that the occupant perceives as an emergency. The TCU 61 determines that there has been an emergency event warranting an automatic report to the TSP call center, in response to crash detection from the processing of the data from the sensor(s) 67 or in response to activation of the panic button 69. In response to any determination of an emergency, the TCU 61 activates the NAD 63 to initiate the communication with the TSP call center 17. The NAD 63 acts as the communications tool for entry to the wide area wireless network via cellular communications.

The vehicle typically includes one or more elements, such as a keypad and display, which form a user interface 68 for non-emergency input/output functions. The bus 65 also provides digital data communications between the user interface 68 and the TCU 61. Of note for purposes of this discussion, a unique action via the user interface 68 will trigger the TCU 61 to initiate the service activation call, using the NAD 63.

The NAD 63 is a wireless transceiver unit configured for communications via the wireless communication facilities of the mobile network and associated landline facilities that make up the system 10 of FIG. 1. The NAD 63 is generally similar to a wireless mobile station 11 configured for voice and data communications. It is assumed that those skilled in the art are familiar with the structure and operation of mobile stations and thus with the structure and operation of generally similar devices that may be used to implement the NAD 63. To insure a full understanding by all readers, however, it may be helpful to consider a high level summary review of the relevant structure of one example of a NAD 63.

The NAD 63 supports both data communication and voice communication. For the voice communication function, the vehicle will include a microphone 71 for audio signal input and a speaker 73 for audio signal output. The microphone 71 and the speaker 73 connect to voice coding and decoding circuitry (vocoder) 75 within the NAD 61. During a voice telephone type communication with the TSP call center, for example, the vocoder 75 provides two-way conversion between analog audio signals representing speech or other audio and digital samples at a compressed bit rate compatible with the digital protocol of the wireless network communications.

For digital wireless communications, the NAD 63 also includes a digital transceiver (XCVR) 77. The concepts discussed here encompass embodiments of the NAD 63 utilizing any digital transceivers that conform to current or future developed digital wireless communication standards. For example, the transceiver 77 could be an EVDO, TDMA or GSM unit designed for cellular or PCS operation. In the present embodiments, the digital transceiver 57 is a CDMA transceiver compatible with operation via an IS-95 network or a 1x-RTT network, to provide both voice and/or data communications. As discussed more, later, such transceivers also support certain over-the-air communications relating to provisioning and/or service activation.

The transceiver 77 provides two-way wireless communication of information, such as vocoded speech samples and digital message information. The transceiver 77 also sends and receives a variety of signaling messages in support of the various communications provided via the NAD 63 and the various wireless network facilities. These signaling messages, for example, also enable SMS communications. The transceiver 77 connects through RF send and receive amplifiers (not separately shown) to an antenna 79. The NAD 63 may include one or more additional transceivers, as shown in dotted line form, for operation in an analog mode or in accord with an alternative digital standard, such as EVDO.

A microprocessor 81 acts as a controller for controlling all operations of the NAD 63. The microprocessor 81 is a programmable controller. The NAD 63 also includes flash type program memory 83 and/or a non-volatile random access memory (RAM) 85, for storing various software routines and mobile configuration settings, for use by the microprocessor 81.

Figure 3:
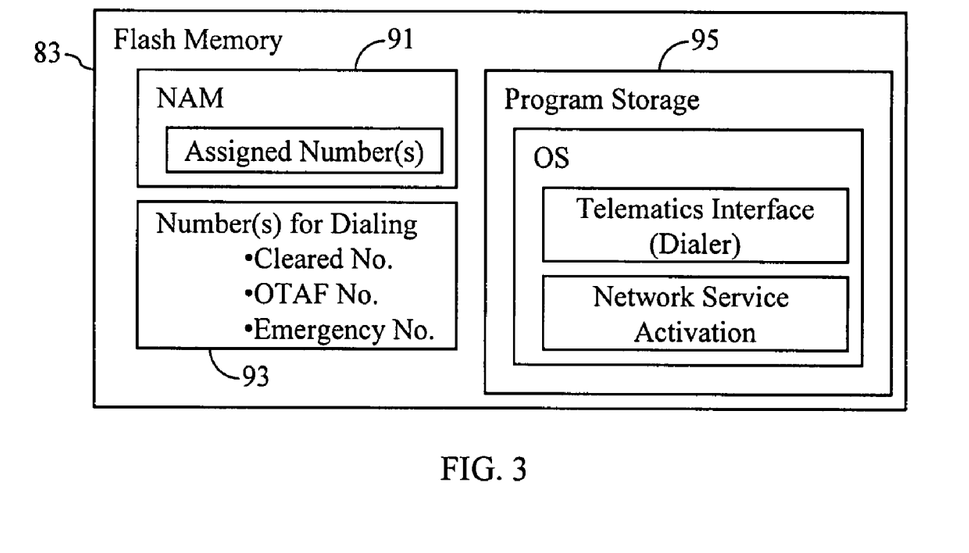
FIG. 3 is a block diagram useful in explaining software and relevant data stored in the network access device (NAD) of the telematics unit.

FIG. 3 is a high level representation of the storage that may be provided by the flash memory 83 and thus of relevant data and programming that may be stored and/or loaded into portions of the flash memory 83. As shown, a portion 91 of the memory 83 is designated as a number assignment module (NAM). The NAM 91 stores one or more numbers assigned to the NAD (much like assignment to a mobile station 11), to enable wireless communication through the base stations 19 and the MSCs 21 of the mobile network. Typically, the NAM 91 will store the assigned mobile identification number (MIN) and may stored a separate mobile directory number (MDN), which are assigned to a mobile station, or in this case to the NAD 63 in the telematics unit 15. Initial provisioning for an activated device (e.g. a reactivated unit 15) entails appropriate programming of the network elements to support services through the customer's wireless service provider's own network and may include some programming of the particular telematics unit 15, e.g. to store its assigned MIN/MDN in the NAM 91 in the flash memory 83.

Another portion 93 of the flash memory 83 stores at least one destination number for dialing with the TCU 61 detects an emergency. When active, this portion 93 will store at least one number assigned to the TSP call center 17, for use in dialing that center 17 upon TCU detection of an emergency. The number storage of an active unit 15 may contain two or more such destination numbers, to allow the telematics unit to make one or more alternative calls in the event a call using the first number fails. However, when a telematics unit 15 is deactivated, the destination number(s) from storage 93 are deleted and replaced with a cleared number, such as 911.

In addition to the emergency dialing number(s), the number storage portion 93 of the flash memory 83 stores one or more numbers for use in an automatic service activation procedure. The storage 93 contains a cleared number for calling the TSP activation center 18. In the example, the storage 93 also contains a number for calling the OTAF platform 35 for receiving provisioning data, such as *22890.

Storage is also provided for programming that is to be executed by the microprocessor 81 of the NAD 63. Although other storage could be provided, in the example, a portion 95 of the flash memory 83 stores the programming. The programming typically includes an operating system (OS) including various device drivers for the hardware of the NAD 63. The programming will also include a telematics interface application running on the OS, to enable the microprocessor 81 to communicate with the TCU 61 and to implement the NAD functions related to telematics communication, under control by the TCU 61. For example, this application would cause the microprocessor 81 to automatically dial the emergency destination number from storage 93, in response to a command which the TCU 61 would generate in the event the TCU detects an emergency.

The program storage 95 may also include an application program for controlling network service activation and deactivation functions of the NAD 63. In an example using the OTAF provisioning system 35, the execution of the network service activation programming by the microprocessor 81 enables the microprocessor to communicate with the OTAF system via the transceiver 77 and the wireless network to receive provisioning data (e.g. MDN/MIN data) and load that data into the NAM storage 91.

Returning to FIG. 2, for position determination, the NAD 63 also includes a GPS receiver 87. Under control of the microprocessor 81, the GPS receiver 87 receives and processes signals from one or more satellites of the GPS constellation of GPS satellites. From its processing, the GPS receiver 87 supplies GPS data to the microprocessor 81, such as pseudorange measurements and associated PN codes for measured satellite signals. Associated computations may be performed in the microprocessor or by a processor or the like included in the GPS receiver, or the data may be forwarded to equipment at the TSP call center for processing to obtain a final fix (latitude and longitude coordinates) as to the location of the vehicle 13.

Figure 4:
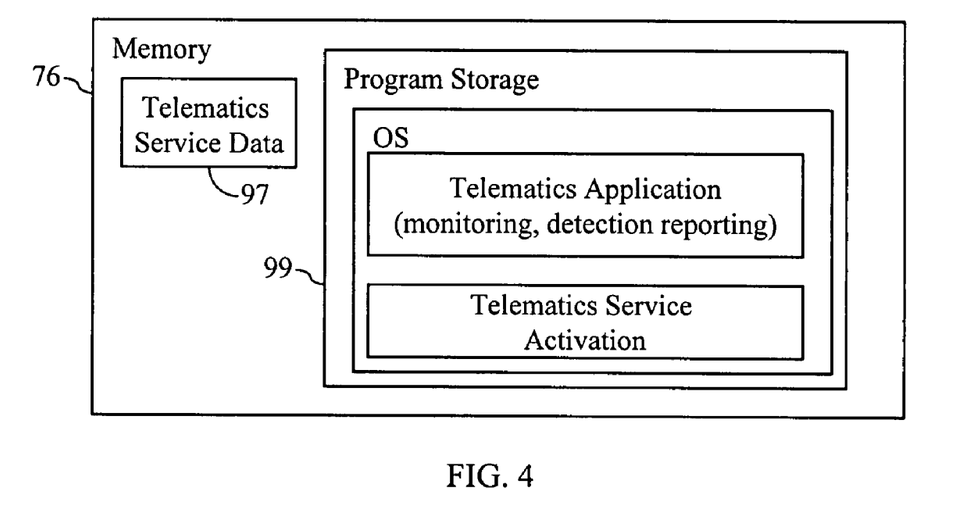
FIG. 4 is a block diagram useful in explaining software and relevant data stored in the telematics control unit (TCU).

It may also be helpful to briefly discuss programming and data storage of the TCU 61. FIG. 4 is a high level representation of the storage that may be provided by the memory 76 and thus of relevant data and programming that may be stored and/or loaded into portions of the memory 76 of the TCU. As shown, a portion 97 stores telematics service data used by the TSP, such as customer identification data, vehicle identification and/or security keys. Some of this data may be permanently stored in the portion 97 of the TCU memory 76, whereas some of the telematics service data may be downloaded during the activation call to the center 18.

Another portion 99 of the memory 76 stores programming that is to be executed by the microprocessor 74 of the TCU 71. The programming typically includes an operating system (OS) including various device drivers, e.g. for communication with various vehicle systems and sensors via the bus 65 and for communication with the NAD 63. The programming will also include a telematics application running on the OS, to enable the microprocessor 74 to implement regular telematics functions, such as monitoring vehicle status, detection of emergency conditions, communications via the NAD and the network to report emergencies, and the like.

The telematics application also enables the microprocessor 74 to detect a predefined user activation of some element or elements in the vehicle 13 as an indication of a desire to activate the unit for telematics service. The unique action, for example, could a two-button push, holding down buttons on the user interface 68 of the device located in the car, or a unique spoken command. Detection of signals corresponding to the unique action causes the microprocessor 74 to activate a telematics service activation application, which is also stored in the program storage section 99 of the TCU memory 76. Execution of the telematics service activation application causes the microprocessor 74 to initiate a sequence of operations to activate service for the device. If successful, the activation procedure will activate service both with respect to the TSP and with respect to the wireless communication network. Two examples of the procedure will be discussed below.

Those skilled in the art will recognize that the distribution of programming as between the TCU and the NAD is only given here by way of example. Programming functions may be shifted between these two elements of the telematics unit 15. For example, the actual emergency dialing program implemented by the telematics unit may be stored in the flash memory 83 of the NAD 63 or this programming may be stored in program section 97 of the memory 76 of the TCU 61. Another approach might integrate the TCU and NAD into a single unit and thus combine programming for those elements.

The structure and operation of the telematics unit 15 with the TCU 63 and the NAD 63, as outlined above, were described to by way of example, only. Those skilled in the art will recognize that the telemantics unit 15 may be implemented and may operate in a variety of other ways.

Figure 5:
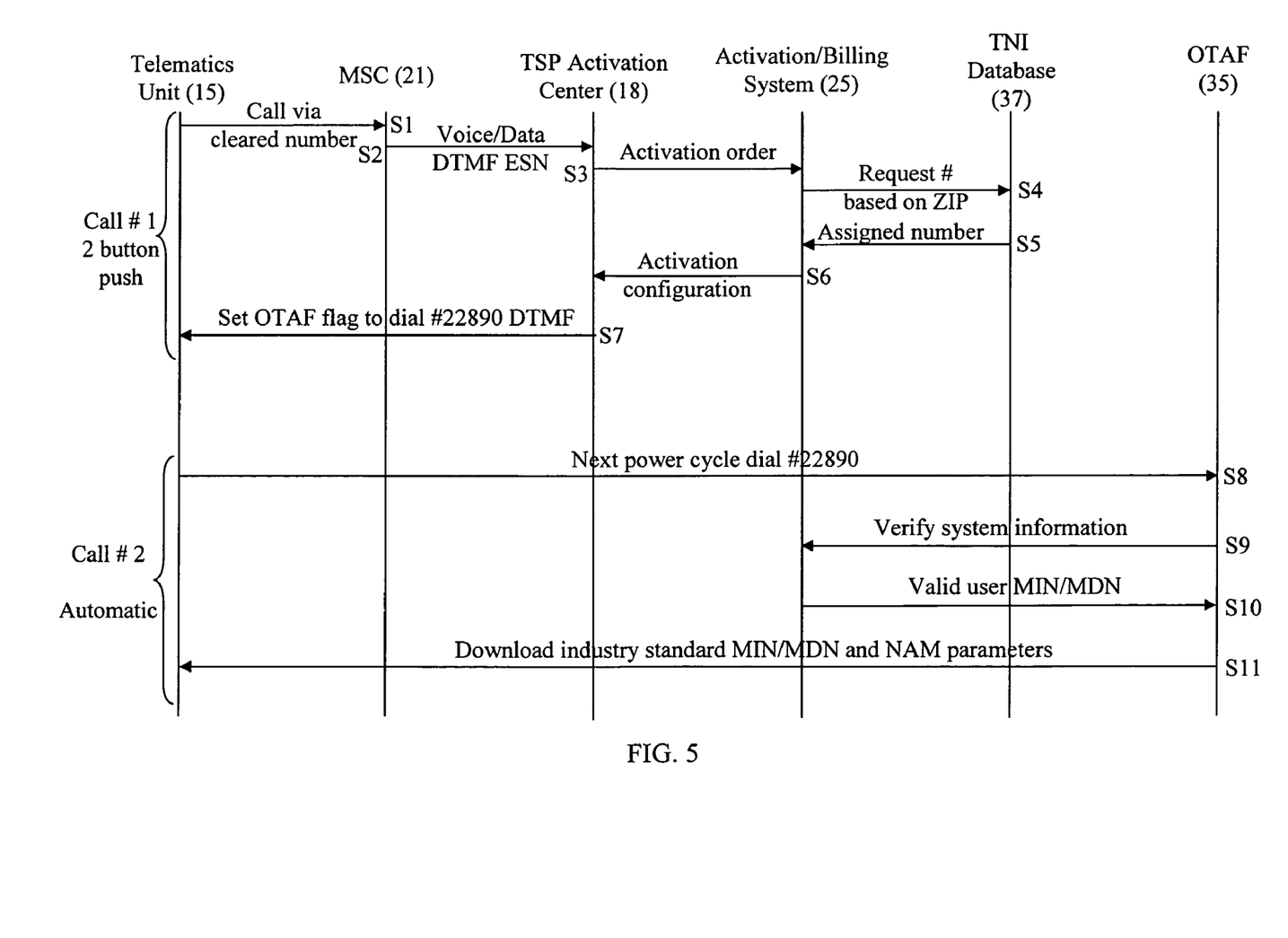
FIG. 5 is a flow chart, useful in understanding a first example of the operations involved in activating a telematics unit for communications via the mobile wireless network, using a cleared number and over-the-air service provisioning.

It may be helpful now to discuss examples of process flows, for activating service with respect to a telematics unit 15. FIG. 5 is a signal flow diagram of a first example, which utilizes the carrier's OTAF system 35 for provisioning the telematics unit 15 with MDN/MIN or other data needed to operate through the network.

Assume for purposes of the example, that the telematics unit 15 had once been active but was previously deactivated, e.g. because the owner or a previous owner of the vehicle 13 decided to terminate service with the TSP or stopped paying for the service. Now, the current owner of the vehicle 13 decides to reactivate telematics service with the TSP. A person in the vehicle 13 therefore performs the unique activation operation, which is detected by the microprocessor 74 of the TCU 61, as outlined above. Under program control, the microprocessor 74 therefore instructs the NAD 63 to initiate an activation call to the TSP's service activation center 18. Hence, in the example, the microprocessor 81 retrieves the cleared number from storage 93 in memory 83 and operates the wireless transceiver 77 to initiate a call to the TSP's service activation center 18 using the cleared number (step 51 in FIG. 5). In the example, this is the start of the first of two calls.

The MSC 21 is configured to complete the first call, based on the cleared number, without validation of the calling device. Hence, the MSC 21 completes the call to activation center 18 (S1). The completed call enables both voice and data communication (S2), in a manner similar to that used for emergency communications with the TSP call center 17. For example, the telematics unit can send dual-tone multi-frequency (DTMF) signals through the voice call to represent the unit's ESN. The TSP personnel at the center 18 can also talk to the person in the vehicle to obtain other information that the TSP might use for its accounting purposes or the like.

Assume now that the TSP successfully completes its procedure(s) for activation of the unit 15 for service to the current owner of the vehicle 13. Hence, in step S3, the TSP service activation center 18 sends a message identifying the telematics unit 15 to the activation/billing system 25 of the mobile communication network. In the system 10 of FIG. 1, for example, the message transmission might take the form of a data message sent through the Internet 47 to the carrier's security gateway 45. If secure, the gateway passes relevant data from the TSP message as a message through the IP network 27 to the carrier's activation/billing system 25. The message, identified as an activation order in step S3 of the example of FIG. 5, requests activation of service for the telematics unit 15 through the mobile communication network and identifies the relevant telematics unit, e.g. by its ESN.

In response, the activation/billing system 25 accesses the TNI database 37, e.g. using a ZIP code for the customer, to request assignment of a directory number (step S4). In step S5, the TNI database 37 responds by providing an available MDN number back to the activation/billing system 25 (step S5) to assign to the reactivated telematics unit 15. The activation/billing system 25 also assigns a MIN number to the telematics unit 15. The activation/billing system 25 sends an activation configuration message back to the TSP activation center (S6), e.g. through the IP network 27, the gateway 45 and the Internet 47, informing the center 18 that the account for telematics unit 15 has been activated and is configured. For information purposes, this message may include assigned number data, e.g. the MDN for use in the TSP customer record associated with the re-activated telematics unit 15.

Although not shown in FIG. 5, the activation/billing system 25 will also provide service provisioning instructions to elements of the wireless network to enable them to provide service to the unit 15. For example, the activation/billing system 25 may send the MDN/MIN and appropriate instructions to a home location register (not shown) to establish a call control record in the register for the telematics unit, so that the network will be able to authenticate the unit for communications through the network.

In response to the activation configuration message from the system 25 (step S6), the TSP call center sends an instruction (at S7) through its existing call link with the telematics unit 15, instructing the unit to set an OTAF flag in the NAD 63 or in the TCU 61, i.e. to instruct the NAD to initiate an OTAF call (to #22890) to obtain service provisioning data. Assume now that the TSP has completed all of its necessary communications with the unit 15 and/or its user. Hence, in response to completion of step S7, the first call between the TSP service activation center 18 and the telematics unit 15 is terminated.

In the next power cycle of the telematics unit 15, e.g. the next time that the vehicle is started, because the OTAF flag has been set, the unit will initiate an OTAF provisioning call. This is the second of two calls in the example of FIG. 5. Hence, at step S8, the microprocessor 81 retrieves the OTAF provisioning number (*22890 in our example) from storage 93 in memory 83 and operates the wireless transceiver 77 to initiate a call to the OTAF provisioning system 35. The MSC 21 is configured to complete any *228 call, without validation of the calling device, to the OTAF provisioning system 35. After completion of the call to the OTAF provisioning system 35, the NAD 61 may send the extra digits, 90 in the example, as DTMF signals. The extra digits indicate to the system 35 that the call is a service activation call (as opposed to any other type of provisioning call, such as a PRL update call).

In response to the *22890 call, the OTAF provisioning system 35 communicates with the telematics unit to obtain the unit's identification, e.g. its ESN. Based on identification of the unit 15, the OTAF provisioning system 35 launches a query through the IP network 27 to the activation/billing system 25 to verify activation and obtain service related provisioning information (S9). Since service for the unit 15 was previously established in our example, the activation/billing system 25 sends back a message indicating that the unit has been validated, including the assigned MIN/MDN number data (S10).

In response to the S10 message from the activation/billing system 25, the OTAF provisioning system 35 downloads standard MIN/MDN and NAM parameters to the telematics unit (S11). This communication could use the voice link through the MSC 21 and the appropriate base station 19, although in many cases, this transmission uses signaling resources and a signaling channel between the base station 19 and the transceiver 77 of the NAD 63. In response, the microprocessor 81 loads the received MIN/MDN and NAM parameters into the NAM storage 91 in the flash memory 83 of the NAD 63. At this point, the second call can be terminated, and the telematics unit 15 is provisioned for normal service through the wireless communication network.

In the example of FIG. 5, the process steps S8 to S11 can be implemented in a manner exactly as used to activate service over-the-air for a mobile station 11. In particular, the operations of the activation/billing system 25 and the OTAF provisioning system 35 in the second call are identical to actions that those systems perform when activating service for a mobile station 11. The carrier's systems control the network provisioning but need not be extensively modified to extend the procedure to provisioning of the telematics unit 15.

Once activated as outlined above, when there is a crash, a user activation of a panic button or another detected condition that constitutes an emergency, the telematics unit 15 dials a destination number of the TSP call center 17. The wireless communication network routes the call to the PSTN 33, and the PSTN completes the call to the TSP call center 17. Initially, the telematics unit sends relevant data, for example, to identify the unit 15 and/or the vehicle 13 as well as GPS data to locate the unit. After the data, communication switches over to voice, e.g. to allow a responder at the call center 17 to talk to a person in the vehicle 13.

Figure 6:
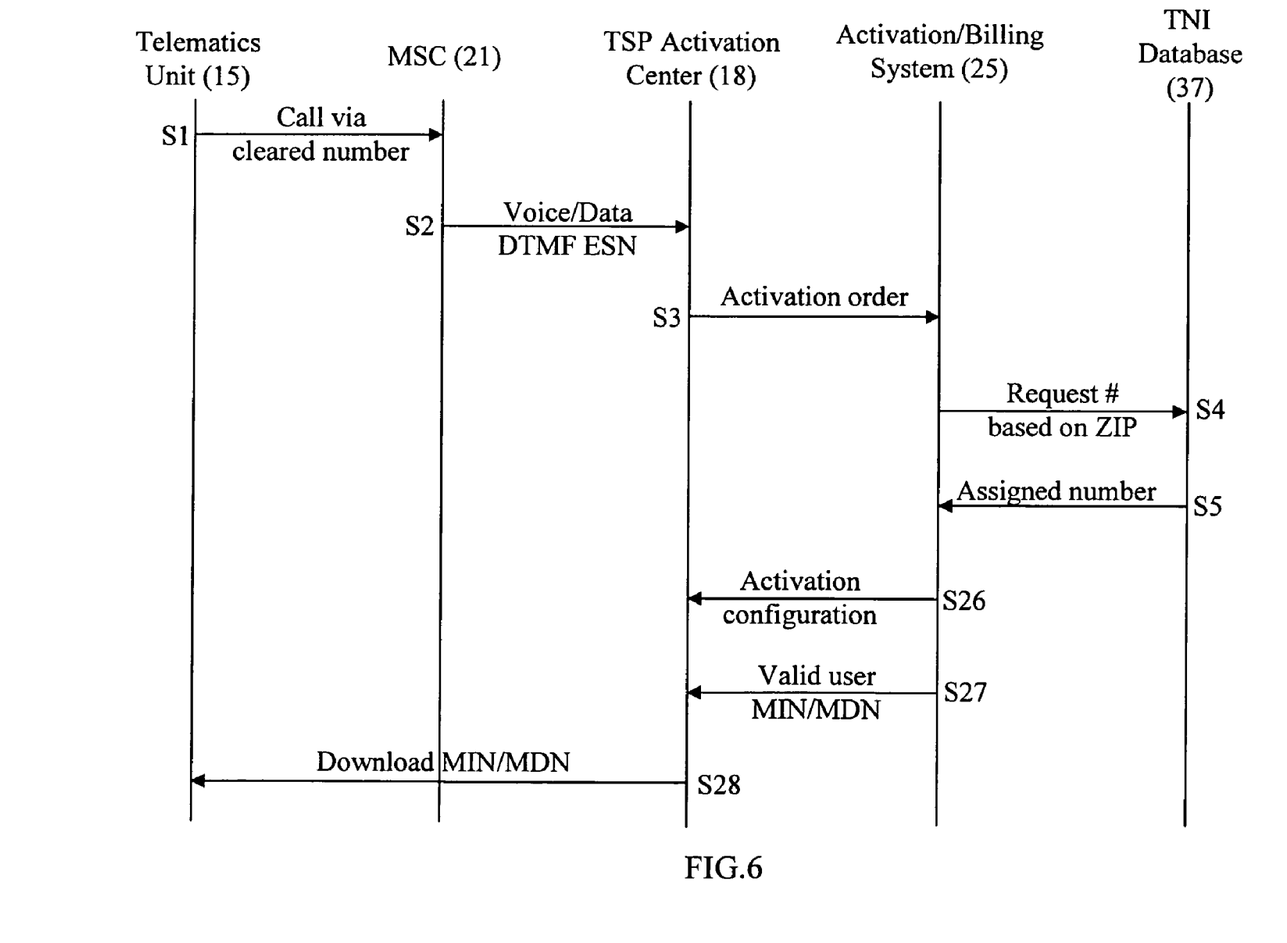
FIG. 6 is a flow chart, useful in understanding a second example of the operations involved in activating a telematics unit for communications via the mobile wireless network.

The example of FIG. 5 relies on the OTAF capability of the network operator and inclusion of OTAF capabilities similar those of a mobile station in the telematics unit 15. The procedure also requires a second call (steps S8 to S11). Some TSPs may prefer to perform the provisioning of their telematics units themselves and/or they may feel that it is necessary to complete the provisioning in one call, that is to say before the customer hangs-up on the first call to the TSP service activation center. FIG. 6 depicts an alternate procedure that allows the TSP to send the provisioning data to the telematics unit, before termination of the call to the TSP service activation center.

In the procedure of FIG. 6, steps S1 to S5 are identical to those in the example of FIG. 5. After step S5, the MDN has been obtained from the TNI database 37, and the activation/billing system 25 has assigned a MIN number to the telematics unit 15. Hence, in step S26, the activation/billing system 25 sends an activation configuration message back to the TSP activation center 18, much as was done in step S6 in the previous example. However, in this example, the activation/billing system 25 also sends the MDN and MIN data to the to the TSP activation center 18 (S27). Although shown as a separate step for ease of understanding here, the assigned number data could be sent in the activation configuration message.

As outlined above, the telematics unit and TSP facilities support both voice and data communication capabilities. Hence, no response to the S27 message from the activation/billing system 25, the equipment of the TSP service activation center 18 downloads standard MIN/MDN and NAM parameters to the telematics unit (S11). This communication uses the voice link through the MSC 21 and the appropriate base station 19. Since this is a data communication for the TSP, the NAD 63 would hand the data message off to the TCU 61. In response, the microprocessor 74 instructs the microprocessor 81 to load the received MIN/MDN and NAM parameters into the NAM storage 91 in the flash memory 83 of the NAD 63. At this point, the second call can be terminated, and the telematics unit is provisioned for normal service through the wireless communication network, as in the earlier example.

Hence, operations described above may be carried out by execution of programming code in the form of software, firmware, or microcode running on one or more of the controllers of the telematics units and/or by processing of relevant data on such programmable devices. The software functionalities involve programming, including executable code as well as associated stored data, for causing the telematics units 15 to implement emergency detection as as the service activation related functions, as exemplified by the discussions above. Code for implementing the telematics and service activation functions may be in the form of computer instruction in any form (e.g. source code, object code, interpreted code, etc.) stored in or carried by any computer or machine-readable medium. In operation, the executable code is stored in an area of memory or the like within the respective telematics unit 15. At other times, however, the programming may be stored at other locations and/or transported for loading into respective equipment, e.g. into the particular unit from a server or the like.

Hence, implementations of the teachings presented herein typically involve one or more software products in the form of one or more modules of executable code and/or data carried by at least one machine readable. Execution of such code by a processor or the like of a telematics unit for example enable the unit to implement steps such as outlined above in the discussion of the call flow examples.

As used herein, terms such as computer or machine "readable medium" refer to any tangible medium that participates in providing instructions and/or data to a processor. Such a medium may take many forms, including but not limited to, volatile or non-volatile storage media and transmission media. Non-volatile storage media include, for example, optical or magnetic disks, such as flash memory of the NAD of FIG. 2 as well as storage devices in any server or computer(s), switches or routers that may be used to store programming for downloading into the telematics unit. Volatile storage media include dynamic memory, such as RAM in the NAD or main memory of a computer platform such as a program server. Physical transmission media include coaxial cables; copper wire and fiber optics, including the wires that comprise a bus within a computer system/server. Carrier-wave transmission media can take the form of electric or electromagnetic signals, or light waves, such as those generated during radio frequency (RF) and infrared (IR) data communications over wireline and wireless links of the mobile communication network. Many of these forms of computer readable media may be involved in carrying one or more sequences of one or more instructions to a processor for storage and/or execution.

Those skilled in the art will recognize that the techniques for service activation discussed above are amenable to a variety of modifications and are adaptable to other service activation applications. For example, although the discussion above has focused on reactivating a telematics unit at a time after service to that unit was terminated, essentially the same techniques may be used to initially activate the unit for service, e.g. at or before time of delivery of a new vehicle with a telematics unit to a new purchaser.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of activating a telematics unit for telematics communication via a mobile communication network,
   wherein the telematics unit is not yet activated for telematics service and is not yet activated for communication via the mobile communication network, the method comprising steps of:
   detecting a unique user actuation of the telematics unit indicating a user intent to activate telematics service and communication via the mobile communication network, through the telematics unit;
   responsive to the detected user actuation, using a cleared number assigned to the telematics service provider for service activation to automatically initiate a wireless call from the telematics unit, through the mobile communication network;
   completing the call from the telematics unit through the mobile communication network to a telematics service provider;
   communicating information between the telematics unit and the telematics service provider, to activate telematics service with respect to the telematics unit, via the completed call through the mobile communication network;
   responsive to the activation of the telematics service, sending a message identifying the telematics unit to a billing system of the mobile communication network requesting activation of service for the telematics unit through the mobile communication network; and
   communicating provisioning data, needed to activate the telematics unit for operation through the mobile communication network, from a system of the mobile communication network to the telematics unit.

2. The method of claim 1, wherein the step of communicating provisioning data comprises:
   terminating the completed call between the telematics unit and the telematics service provider;
   following termination, initiating another wireless call from the telematics unit, through the mobile communication network, using a number assigned for mobile station service activation;
   based on the mobile station service activation number, completing the other call from the telematics unit through the mobile communication network to a service provisioning platform of an operator of the mobile communication network; and
   responsive to completion of the other call, downloading the provisioning data needed to activate the telematics unit for operation through the mobile communication network from the service provisioning platform into the telematics unit.

3. The method of claim 1, wherein the step of communicating provisioning data comprises:
   communicating the provisioning data needed to activate the telematics unit for operation through the mobile communication network from the billing system to the telematics service provider; and
   downloading the provisioning data needed to activate the telematics unit for operation through the mobile communication network from the telematics service provider to the telematics unit, via the completed call through the mobile communication network.

4. The method of claim 1, wherein the provisioning data includes a mobile directory number (MDN) and a mobile identification number (MIN) assigned to the telematics unit for use in wireless communications through the mobile communication network.

5. A telematics unit, comprising:
   an interface for receiving signals from one or more input elements for monitoring with respect to possible occurrence of an emergency condition;
   a wireless transceiver for wireless communications through a mobile communication network;
   at least one processor coupled to the interface and the wireless transceiver;
   a memory coupled to the at least one processor, the memory having provisioning data storage and having program storage; and
   programming in the program storage memory for execution by the at least one processor, wherein execution of the programming enables the at least one processor to control operations of the telematics units to perform functions, including:
   (a) obtaining activation information in the telematics unit from a telematics service provider, indicating activation of telematics service with respect to the telematics unit, wherein the programmed function of obtaining activation information from the telematics service provider comprises:
      when the telematics unit is not yet activated for telematics service and is not yet activated for communication via the mobile communication network, detecting a unique user actuation of the telematics unit indicating a user intent to activate telematics service through the telematics unit;
      responsive to the detected user actuation, using a cleared number assigned to the telematics service provider for service activation to initiate a wireless call from the telematics unit, through the mobile communication network to the telematics service provider for service activation; and
      receiving the activation information in the telematics unit from the telematics service provider, via the wireless call to the telematics service provider;
   (b) in response to activation of telematics service, automatically initiating a wireless call from the telematics unit, through the mobile communication network, to a service provisioning platform of an operator of the mobile communication network; and
   (c) receiving provisioning data needed to activate the telematics unit for operation through the mobile communication network from the service provisioning platform and storing the received provisioning data in the provisioning data storage; and
   (d) after receiving the provisioning data, processing signals received via the interface to detect occurrence of the emergency condition, and in response to detecting the occurrence of the emergency condition operating the wireless transceiver to initiate a communication attempt through the mobile communication network using the stored provisioning data.

6. The telematics unit of claim 5, wherein the provisioning data includes a mobile directory number (MDN) and a mobile identification number (MIN) assigned to the telematics unit for use in wireless communications through the mobile communication network.

* * * * *